(12) United States Patent
Skotheim et al.

(10) Patent No.: US 7,247,408 B2
(45) Date of Patent: Jul. 24, 2007

(54) LITHIUM ANODES FOR ELECTROCHEMICAL CELLS

(75) Inventors: Terje A. Skotheim, Tucson, AZ (US); Christopher J. Sheehan, Tucson, AZ (US); Yuriy V. Mikhaylik, Tucson, AZ (US); John Affinito, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 439 days.

(21) Appl. No.: 09/864,890

(22) Filed: May 23, 2001

(65) Prior Publication Data

US 2002/0012846 A1 Jan. 31, 2002

Related U.S. Application Data

(63) Continuation-in-part of application No. 09/721,578, filed on Nov. 21, 2000, now Pat. No. 6,797,428, and a continuation-in-part of application No. 09/721,519, filed on Nov. 21, 2000, now Pat. No. 6,733,924.

(60) Provisional application No. 60/167,171, filed on Nov. 23, 1999.

(51) Int. Cl.
*H01M 4/40* (2006.01)

(52) U.S. Cl. .................. 429/231.95; 429/218.1

(58) Field of Classification Search ........... 429/231.95, 429/209, 218.1, 236, 245; 29/623.5; 427/123, 427/126.3
See application file for complete search history.

(56) References Cited

U.S. PATENT DOCUMENTS

| 4,664,991 A | 5/1987 | Perichaud et al. |
| 4,739,018 A | 4/1988 | Armand et al. |
| 4,833,048 A | 5/1989 | Dejonghe et al. |
| 4,917,974 A | 4/1990 | Dejonghe et al. |

(Continued)

FOREIGN PATENT DOCUMENTS

WO  WO97/44840  11/1997

(Continued)

OTHER PUBLICATIONS

Zhuang et al., The reaction of lithium with carbon dioxide studied by photoelectron spectroscopy:, Surface Science, 1998, 418 139-149.*

(Continued)

*Primary Examiner*—Michael Barr
*Assistant Examiner*—Monique Wills
(74) *Attorney, Agent, or Firm*—Jacqueline M. Nicol; Squire, Sanders & Dempsey L.L.P.

(57) ABSTRACT

Provided is an anode for use in electrochemical cells, wherein the anode active layer has a first layer comprising lithium metal and a multi-layer structure comprising single ion conducting layers and polymer layers in contact with the first layer comprising lithium metal or in contact with an intermediate protective layer, such as a temporary protective metal layer, on the surface of the lithium-containing first layer. Another aspect of the invention provides an anode active layer formed by the in-situ deposition of lithium vapor and a reactive gas. The anodes of the current invention are particularly useful in electrochemical cells comprising sulfur-containing cathode active materials, such as elemental sulfur.

8 Claims, 4 Drawing Sheets

U.S. PATENT DOCUMENTS

| | | | |
|---|---|---|---|
| 4,954,371 A | 9/1990 | Yializis | |
| 5,162,175 A | 11/1992 | Visco et al. | |
| 5,194,341 A | 3/1993 | Bagley et al. | |
| 5,277,514 A * | 1/1994 | Glickman | 404/41 |
| 5,314,765 A * | 5/1994 | Bates | 429/231.95 |
| 5,324,599 A | 6/1994 | Oyama et al. | |
| 5,366,829 A | 11/1994 | Saidi | |
| 5,387,479 A * | 2/1995 | Koksbang | 429/126 |
| 5,415,954 A | 5/1995 | Gauthier et al. | |
| 5,429,891 A * | 7/1995 | Gozdz et al. | 429/316 |
| 5,434,021 A | 7/1995 | Fauteux et al. | |
| 5,441,831 A | 8/1995 | Okamoto et al. | |
| 5,460,905 A | 10/1995 | Skotheim | |
| 5,462,566 A | 10/1995 | Skotheim | |
| 5,487,959 A | 1/1996 | Koksbang | |
| 5,516,598 A | 5/1996 | Visco et al. | |
| 5,522,955 A * | 6/1996 | Brodd | 156/182 |
| 5,529,860 A | 6/1996 | Skotheim et al. | |
| 5,538,812 A | 7/1996 | Lee et al. | |
| 5,569,520 A * | 10/1996 | Bates | 429/162 |
| 5,601,947 A | 2/1997 | Skotheim et al. | |
| 5,648,187 A | 7/1997 | Skotheim | |
| 5,681,615 A | 10/1997 | Affinito et al. | |
| 5,690,702 A | 11/1997 | Skotheim et al. | |
| 5,723,230 A | 3/1998 | Naoi et al. | |
| 5,731,104 A | 3/1998 | Ventura et al. | |
| 5,783,330 A | 7/1998 | Naoi et al. | |
| 5,792,575 A | 8/1998 | Naoi et al. | |
| 5,824,434 A * | 10/1998 | Kawakami et al. | 429/209 |
| 5,882,819 A | 3/1999 | Naoi et al. | |
| 5,961,672 A | 10/1999 | Skotheim et al. | |
| 6,025,094 A | 2/2000 | Visco et al. | |
| 6,117,590 A | 9/2000 | Skotheim et al. | |
| 6,117,593 A * | 9/2000 | Stachoviak et al. | 429/242 |
| 6,153,337 A | 11/2000 | Carlson et al. | |
| 6,183,901 B1 | 2/2001 | Ying et al. | |
| 6,201,100 B1 | 3/2001 | Gorkovenko et al. | |
| 6,202,591 B1 | 3/2001 | Witzman et al. | |
| 6,402,795 B1 * | 6/2002 | Chu et al. | 29/623.5 |

FOREIGN PATENT DOCUMENTS

| | | |
|---|---|---|
| WO | WO99/33125 | 7/1999 |
| WO | WO 01/39302 | 5/2001 |
| WO | WO 01/39303 | 5/2001 |

OTHER PUBLICATIONS

Zhuang et al., The Readtion of Lithium with Carbon Dioxide Studied by Photoelectron Spectroscopy Surface Science, 1998.*

Alamgir et al. "Room Temperature Polymer Electrolytes", *Lithium Batteries, New Materials, Developments and Perspectives*, Chapter 3, pp. 93-136, Elsevier, Amsterdam (1994).

Zhuang et al., "The reaction of lithium with carbon dioxide studied by photoelectron spectroscopy", *Surface Science*, 1998, 418, 139-149.

* cited by examiner

LITHIUM ANODES FOR ELECTROCHEMICAL CELLS

RELATED APPLICATION

This application is a continuation-in-part of U.S. application Ser. No. 09/721,578, filed 21 Nov. 2000 now U.S. Pat. No. 6,797,428, and U.S. application Ser. No. 09/721,519, filed 21 Nov. 2000 now U.S. Pat. No. 6,733,924; both of which claim priority to U.S. Provisional Patent Application Ser. No. 60/167,171, filed 23 Nov. 1999, the disclosures of which are incorporated herein by reference in their entirety for all purposes.

TECHNICAL FIELD

The present invention relates generally to the field of lithium anodes for use in electrochemical cells. More particularly, the present invention pertains to an anode for use in an electrochemical cell comprising an anode active layer comprising lithium metal in contact with a multilayer structure comprising three or more layers interposed between the anode active layer and a non-aqueous electrolyte. The present invention also pertains to methods of forming such anodes, electrochemical cells comprising such anodes, and methods of making such cells.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

There has been considerable interest in recent years in developing high energy density batteries with lithium containing anodes. Lithium metal is particularly attractive as the anode of electrochemical cells because of its extremely light weight and high energy density, compared for example to anodes, such as lithium intercalated carbon anodes, where the presence of non-electroactive materials increases weight and volume of the anode, and thereby reduces the energy density of the cells, and to other electrochemical systems with, for example, nickel or cadmium electrodes. Lithium metal anodes, or those comprising mainly lithium metal, provide an opportunity to construct cells which are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight. Unfortunately, the reactivity of lithium and the associated cycle life, dendrite formation, electrolyte compatibility, fabrication and safety problems have hindered the commercialization of cells with lithium anodes.

The separation of a lithium anode from the electrolyte of the cell is desirable for reasons including the prevention of dendrites during recharging, reaction with the electrolyte, and cycle life. For example, reactions of lithium anodes with the electrolyte may result in the formation of resistive film barriers on the anode. This film barrier increases the internal resistance of the battery and lowers the amount of current capable of being supplied by the battery at the rated voltage.

Many different solutions have been proposed for the protection of lithium anodes including coating the lithium anode with interfacial or protective layers formed from polymers, ceramics, or glasses, the important characteristic of such interfacial or protective layers being to conduct lithium ions. For example, U.S. Pat. Nos. 5,460,905 and 5,462,566 to Skotheim describe a film of an n-doped conjugated polymer interposed between the alkali metal anode and the electrolyte. U.S. Pat. No. 5,648,187 to Skotheim and U.S. Pat. No. 5,961,672 to Skotheim et al. describe an electrically conducting crosslinked polymer film interposed between the lithium anode and the electrolyte, and methods of making the same, where the crosslinked polymer film is capable of transmitting lithium ions. U.S. Pat. No. 5,314,765 to Bates describes a thin layer of a lithium ion conducting ceramic coating between the anode and the electrolyte. Yet further examples of interfacial films for lithium containing anodes are described, for example, in: U.S. Pat. Nos. 5,387,479 and 5,487,959 to Koksbang; U.S. Pat. No. 4,917,975 to De Jonghe et al.; U.S. Pat. No. 5,434,021 to Fauteux et al.; and U.S. Pat. No. 5,824,434 to Kawakami et al.

A single protective layer of an alkali ion conducting glassy or amorphous material for alkali metal anodes, for example, in lithium-sulfur cells, is described in U.S. Pat. No. 6,025,094 to Visco et al. to address the problem of short cycle life.

Despite the various approaches proposed for methods for forming lithium anodes and the formation of interfacial or protective layers, there remains a need for improved methods, which will allow for increased ease of fabrication of cells, while providing for cells with long cycle life, high lithium cycling efficiency, and high energy density.

SUMMARY OF THE INVENTION

The anode of the present invention for use in an electrochemical cell comprises: (i) a first anode active layer comprising lithium metal; and (ii) a multi-layer structure in contact with a surface layer of the first anode active layer; wherein the multi-layer structure comprises three or more layers, wherein each of the three or more layers comprises a layer selected from the group consisting of single ion conducting layers and polymer layers. In one embodiment, the multi-layer structure comprises four or more layers.

The anode active layers of the present invention may further comprise a layer of a temporary protective material in contact with a surface of the first anode active layer, and interposed between the anode active layer and the multi-layer. Examples of temporary protective layers include, but are not limited to temporary metal layers, and intermediate layers formed from the reaction of a gaseous material with the lithium surface, such as plasma $CO_2$ treatments. The temporary metal layer is capable of forming an alloy with lithium metal or is capable of diffusing into lithium metal.

The anodes may further comprise a substrate, wherein the substrate is in contact with a surface of the first layer on the side opposite to the multi-layer structure, or temporary protective layer. Preferable, the substrate is selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. Polymer films are especially preferred because of their light weight.

The single ion conducting layer of the anode of the present invention preferably comprises a glass selected from the group consisting of lithium silicates, lithium borates, lithium aluminates, lithium phosphates, lithium phosphorus oxynitrides, lithium silicosulfides, lithium germanosulfides, lithium lanthanum oxides, lithium tantalum oxides, lithium niobium oxides, lithium titanium oxides, lithium borosulfides, lithium aluminosulfides, and lithium phosphosulfides and combinations thereof.

The polymer layer of the anode of the present invention may be selected from the group consisting of electrically conductive polymers, ionically conductive polymers, sulfonated polymers, and hydrocarbon polymers. In a preferred embodiment the polymer layers comprise a crosslinked polymer. In one embodiment, the polymer layer of the multilayer structure comprises a polymer layer formed from the polymerization of one or more acrylate monomers selected from the group consisting of alkyl acrylates, glycol acrylates, and polyglycol acrylates.

The multi-layer structure of the anode may further comprise a metal alloy layer. In one embodiment, the metal alloy layer preferably comprises a metal selected from the group consisting of Zn, Mg, Sn, and Al. Such a layer is interposed between the other layers of the multi-layer structure or may form the outer layer of the structure.

Another aspect of the present invention pertains to methods for forming anodes according to the present invention. The layers of the anode of the present invention may be deposited by any of the methods, such as, but not limited to physical deposition methods, chemical vapor deposition methods, extrusion, and electroplating. Deposition is preferably carried out in a vacuum or inert atmosphere.

Still another aspect of the anodes of the present invention pertains to methods to deposit in-situ on a substrate anode-active layers comprising lithium co-deposited with a gaseous material, such as, for example, $CO_2$ or acetylene ($C_2H_2$).

Anodes of the present invention are suitable for use in both primary or secondary cells. In one embodiment, the present invention provides an electrochemical cell comprising: (a) a cathode comprising a cathode active material; (b) an anode; and (c) a non-aqueous electrolyte interposed between the anode and the cathode, wherein the anode comprises: (i) a first anode active layer comprising lithium metal, as described herein; and (ii) a multi-layer structure, as described herein, in contact with a surface layer of the first layer; wherein the multi-layer structure comprises three or more layers wherein each of the three or more layers comprises a layer selected from the group consisting of single ion conducting layers and polymer layers. The electrolyte is selected from the group consisting of liquid electrolytes, solid polymer electrolytes, and gel polymer electrolytes. In one embodiment, the non-aqueous electrolyte is a liquid. In one embodiment, the electrolyte comprises a separator selected from the group consisting of polyolefin separators and microporous xerogel layer separators. The cathode active material may comprise one or more materials selected from the group consisting of electroactive metal chalcogenides, electroactive conductive polymers, and electroactive sulfur-containing materials, and combinations thereof. In one embodiment, the cathode active material comprises electroactive sulfur-containing materials, as described herein.

As will be appreciated by one of skill in the art, features of one aspect or embodiment of the invention are also applicable to other aspects or embodiments of the invention.

DETAILED DESCRIPTION OF THE INVENTION

Figure 1:
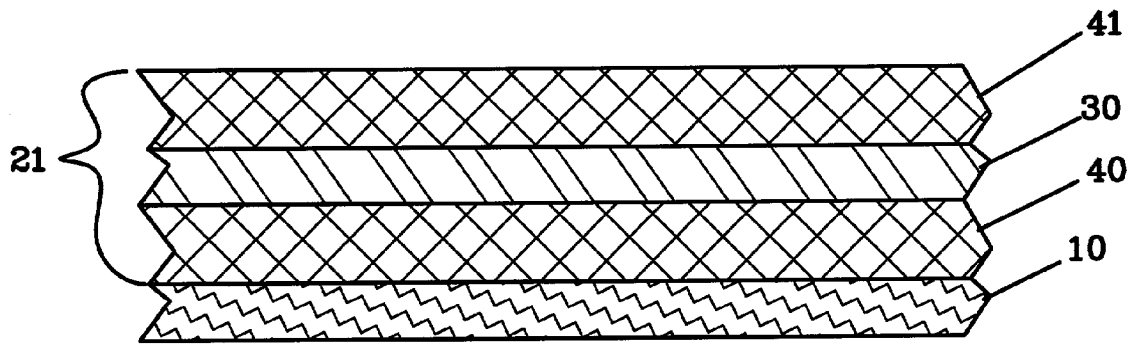
FIG. 1 shows a sectional view of one embodiment of the anode of the present invention comprising (a) a first layer 10 comprising lithium metal, and (b) a multi-layer structure 21 comprising a single ion conducting layer 40, a polymer layer 30, and a single ion conducting layer 41.

The difficulties encountered by the reactivity of a lithium anode surface of, for example, a Li/S electrochemical cell during storage or cycling, may, according to the present invention, be solved by the use of an anode comprising a multi-layer structure. The multilayer structure of the anode allows passage of lithium ions while acting as a barrier to other cell components more effectively, than single or dual layer interfacial films.

One aspect of the present invention pertains to an anode for use in an electrochemical cell, wherein the anode comprises:
(i) a first anode active layer comprising lithium metal; and
(ii) a multi-layer structure in contact with a surface of the first layer; wherein the multi-layer structure comprises three or more layers, wherein each of the layers comprises a single ion conducting layer or a polymer layer.

The anode of the electrochemical cells of the present invention may further comprise an intermediate layer between the first anode active layer comprising lithium and the multilayer structure.

Anode Active Layers

The first layer of the anode of the present invention comprises lithium metal as the anode active material. In one embodiment of the anodes of the present invention, the first anode active layer of the anode is lithium metal. The lithium metal may be in the form of a lithium metal foil or a thin lithium film that has been deposited on a substrate, as described below. If desirable for the electrochemical properties of the cell, the lithium metal may be in the form of a lithium alloy such as, for example, a lithium-tin alloy or a lithium aluminum alloy.

The thickness of the first layer comprising lithium may vary from about 2 to 200 microns. The choice of the thickness will depend on cell design parameters such as the excess amount of lithium desired, cycle life, and the thickness of the cathode electrode. In one embodiment, the thickness of the first anode active layer is in the range of about 2 to 100 microns. In one embodiment, the thickness of the first anode active layer is in the range of about 5 to 50 microns. In one embodiment, the thickness of the first anode active layer is in the range of about 5 to 25 microns. In another embodiment, the thickness of the first anode active layer is in the range of about 10 to 25 microns.

The anodes of the present invention may further comprise a substrate, as is known in the art, in contact with a surface of the first anode active layer on the side opposite to that of, for example, the multi-layer structure, intermediate or temporary metal layer. Substrates are useful as a support on which to deposit the first layer comprising the anode active material, and may provide additional stability for handling of thin lithium film anodes during cell fabrication. Further, in the case of conductive substrates, these may also function as a current collector useful in efficiently collecting the electrical current generated throughout the anode and in providing an efficient surface for attachment of the electrical contacts leading to the external circuit. A wide range of substrates are known in the art of anodes. Suitable substrates include, but are not limited to, those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, the substrate is a metallized polymer film. Examples of polymer films include, but are not limited to, polyethylene terephthalate (PET), polyethylene naphthalate (PEN), 1,4-cyclohexanedimethylene terephthalate, polyethylene isophthalate, and polybutylene terephthalate.

Another aspect of the anodes of the present invention pertains to methods to deposit in-situ on a substrate anode-active layers comprising lithium co-deposited with a gaseous material, such as, for example, $CO_2$ or acetylene ($C_2H_2$), as described herein.

In one aspect of the anode of the present invention, the multi-layered structure of the present invention may be placed in direct contact with a surface of the first anode active layer comprising lithium. In another embodiment of the present invention, it may be desirable for the anode active layer to further comprise an intermediate layer interposed between a surface of the first anode active layer and a surface of the multi-layered structure. Such intermediate layers may, for example, comprise a temporary protective metal layer, or a layer formed from the reaction of $CO_2$, $SO_2$, or other reactive gaseous material with the lithium surface to provide either a temporary protective material layer or a permanent interfacial protective layer.

The difficulties encountered by the reactivity of a lithium surface during deposition of, for example, anode stabilizing layers (ASL), may, according to the present invention, be solved by depositing over the lithium surface prior to coating or depositing such a stabilizing or other layer, a layer of a temporary protective material, such as, for example, a temporary protective metal. The temporary protective material layer acts as a barrier layer to protect the lithium surface during deposition of other anode layers, such as during the deposition of the multi-layer structure of the present invention. Suitable temporary protective material layers include, but are not limited to, temporary metal layers. Further, the temporary protective layer may allow transportation of the lithium films from one processing station to the next without undesirable reactions occurring at the lithium surface during assembly of cells, or for solvent coating of layers onto the anode.

In one embodiment of the anode of the present invention, a layer of a temporary protective material may be placed in contact with the first anode active layer comprising lithium metal on the side of the anode active layer facing the multi-layer structure. In one embodiment, the temporary protective material is a temporary metal layer. The temporary protective metal is selected for its ability to form an alloy with, dissolve into, blend with, or diffuse into the lithium metal of the first layer comprising lithium metal. In one embodiment, the metal of the temporary protective layer is selected from the group consisting of copper, magnesium, aluminum, silver, gold, lead, cadmium, bismuth, indium, gallium, germanium, zinc, tin, and platinum. In a preferred embodiment the metal of the temporary protective metal layer is copper.

The thickness of the temporary protective metal layer interposed between the first anode active layer and the multi-layer structure or other layer of the anode is selected to provide the necessary protection to the layer comprising lithium, for example, during subsequent treatments to deposit other anode or cell layers, such as interfacial or protective layers. It is desirable to keep the layer thickness as thin as possible while providing the desired degree of protection so as to not add excess amounts of non-active materials to the cell which would increase the weight of the cell and reduce its energy density. In one embodiment of the present invention, the thickness of the temporary protective layer is about 5 to 500 nanometers. In one embodiment of the present invention, the thickness of the temporary protective layer is about 20 to 200 nanometers. In one embodiment of the present invention, the thickness of the temporary protective layer is about 50 to 200 nanometers. In one embodiment of the present invention, the thickness of the temporary protective layer is about 100 to 150 nanometers.

During subsequent storage of an anode of this invention, comprising the first anode active layer and the temporary protective metal layer, or during storage of an electrochemical cell into which an anode of this invention is assembled, or during electrochemical cycling of the cell comprising an anode of the present invention, the temporary protective metal layer is capable of forming an alloy with, dissolving into, blending with, or diffusing into the lithium metal to yield a single anode active layer comprising lithium metal. Lithium metal is known to alloy with certain metals as described herein, and has further been observed to diffuse or alloy with thin layers of certain other metals such as, for example, copper. The interdiffusion or alloying can be assisted by heating the anode assembly. Further it has been found that alloying or diffusion of the temporary protective metal layer and lithium can be slowed or prevented by storage of the anode at low temperatures, such as at or below 0° C. This feature may be utilized in the method of preparing anodes of the present invention.

According to another aspect of the present invention an intermediate layer may be formed on a surface of an anode active layer comprising lithium from the reaction of $CO_2$, $SO_2$, or other reactive gaseous material, such as, for example, $C_2H_2$, with the lithium surface. In one embodiment of the anode of the present invention, the intermediate layer is a plasma $CO_2$ treatment layer. In one embodiment, the plasma $CO_2$ treatment layer is interposed between the first anode active layer and the multi-layered structure of the anode.

Such layers may be formed by treating the surface of the anode active layer, such as a lithium foil or a lithium film on a substrate, or may be formed at the time of vacuum deposition of lithium vapor on a substrate.

Figure 6:
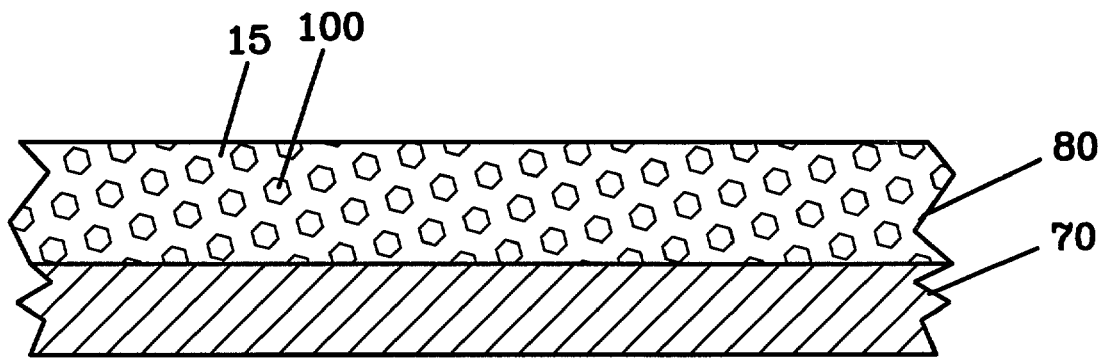
FIG. 6 shows a sectional view of one embodiment of the anode of the present invention comprising (a) a substrate 70 and (b) a layer 80 comprising lithium 15 co-deposited with a gaseous material 100.

In an alternative approach, an interfacial layer may be formed during the vacuum deposition of lithium films on a substrate by co-depositing in situ lithium vapor and a reactive gaseous material. Such a co-deposition may result in an anode active layer 80 comprising lithium 15 and a reaction product of the reactive gas and lithium 100 on a substrate 70, as illustrated in FIG. 6.

In one embodiment of the present invention; the anode comprises: (a) an anode active layer comprising lithium metal co-deposited in-situ with one or more gaseous materials; and (b) a substrate. Suitable gaseous material include, but are not limited to, said one or more materials are selected from the group consisting of carbon dioxide, acetylene, nitrogen, ethylene, sulfur dioxide, and hydrocarbons. Suitable substrates include those selected from the group consisting of metal foils, polymer films, metallized polymer films, electrically conductive polymer films, polymer films having an electrically conductive coating, electrically conductive polymer films having an electrically conductive metal coating, and polymer films having conductive particles dispersed therein. In one embodiment, anode further comprises a multi-layered structure in contact with a surface of the anode active layer, on the side opposite to the substrate.

Figure 7:
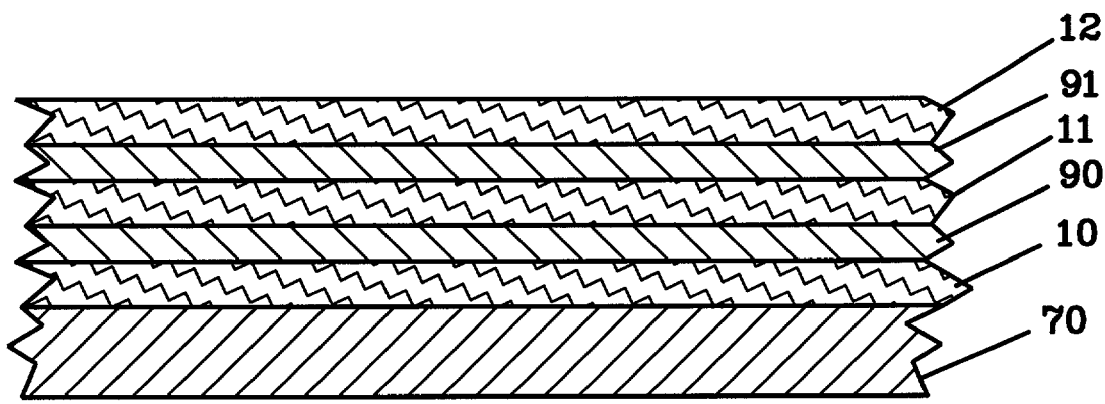
FIG. 7 shows a sectional view of one embodiment of the anode of the present invention comprising (a) a substrate 70, (b) a first lithium layer 10, (c) a gaseous treatment layer 90, (c) a second lithium layer 11, (d) a second gaseous treatment layer 91, and (e) a third lithium layer 12.
Figure 8:
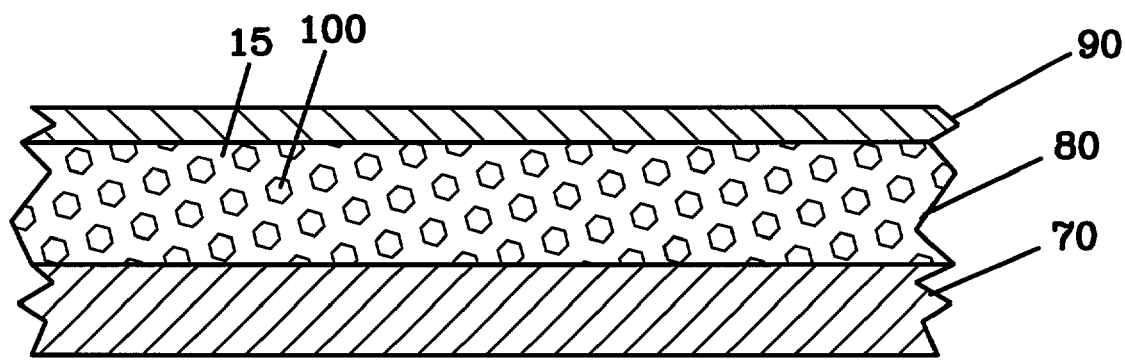
FIG. 8 shows a sectional view of one embodiment of the anode of the present invention comprising (a) a substrate 70, (b) a layer 80 comprising lithium 15 co-deposited with a gaseous material 100, and (c) a gaseous treatment layer 90.

Embodiments may be envisaged in which Li/$CO_2$/Li/$CO_2$/Li layers, as shown in FIG. 7, are built up by successive passes of the anode through the equipment.

The thickness of the intermediate or temporary protective layer, if present as a discrete layer, is selected to provide the necessary protection to the layer comprising lithium, for example, during subsequent treatments to deposit other anode or cell layers, such as interfacial or protective layers. It is desirable to keep the layer thickness as thin as possible while providing the desired degree of protection so as to not add excess amounts of non-active materials to the cell which would increase the weight of the cell and reduce its energy density. Preferably, the thickness of the intermediate or temporary protective layer is about 5 to 500 nanometers, and more preferably is about 20 to 200 nanometers.

Methods to treat the anode active layer comprising lithium are not limited to vapor or vacuum deposition techniques, and may include treatment with reactive materials in the liquid or fluid state. For example, the surface of the anode active layer comprising lithium may be treated with supercritical fluid $CO_2$.

Although it is preferred to interpose the reactive intermediate layer between the anode active layer and the multi-layer structure, or to directly deposit the multi-layered structure on the anode active layer formed by the co-deposition of lithium vapor and a reactive gaseous material, in some instances an anode of the co-deposited anode active layer or of the anode active layer and intermediate layer may be used directly in electrochemical cells without the multi-layered structure and may be beneficial to cell performance.

The anodes or anode active layers of the present invention, further comprising a temporary metal layer or other intermediate layer, such as $CO_2$ or $SO_2$ induced layers, are especially desirable when an interfacial layer of some type is desired between the lithium surface and the electrolyte. For example, when a single ion conducting layer is desired at the lithium interface, it is preferable to deposit this directly on the lithium surface. However, the precursors to or components of such an interfacial layer may react with lithium to produce undesirable by-products or result in undesirable changes in the morphology of the layers. By depositing a temporary protective metal layer or other intermediate layer on the lithium surface prior to depositing the interfacial layer such as the multi-layer structure of the present invention, side reactions at the lithium surface may be eliminated or significantly reduced. For example, when an interfacial film of a lithium phosphorus oxynitride, as described in U.S. Pat. No. 5,314,765 to Bates, is deposited in a nitrogen atmosphere by sputtering of $Li_3PO_4$ onto a lithium surface, the nitrogen gas may react with lithium to form lithium nitride ($LiN_3$) at the anode surface. By depositing a layer of a temporary protective metal, for example, copper over the lithium surface, the interfacial layer may be formed without the formation of lithium nitride.

Multi-Layered Structure

The anodes of the present invention may comprise one or more single ion conducting layers or one or more polymer layers in contact with a surface of the first anode active layer, as described herein. Such combinations of single ion conducting or polymer layers that result in a total of three or more layers are referred to herein as "multi-layered structures". In the case of an intermediate layer, such as a temporary protective material layer, on the first anode active layer the multi-layer structure may not be in direct contact with the first anode active layer comprising lithium metal, but in contact with the intermediate layer.

In one embodiment of the present invention, where such an intermediate layer is present, the anode comprises a third layer, which third layer is in contact with a second or intermediate layer, on the side opposite to the first anode active layer, where the first anode active layer comprises lithium metal. In one embodiment, the second or intermediate layer is a temporary protective metal layer. This third layer may function as an interfacial layer, for example, as an anode stabilizing or as an anode protective layer between the anode active layer and the electrolyte of the cell. In one embodiment, the third layer is a single ion conducting layer. In one embodiment, the third layer comprises a polymer. Other types of interfacial or protective layers may also be deposited as a third layer, as are known in the art.

The thickness of the third layer of the anode of the present invention may vary over a wide range from about 5 nanometers to about 5000 nanometers, and is dependent on the thickness of the layer required to provide the desired beneficial effect of the layer while maintaining properties needed for cell construction such as flexibility and low interfacial resistance. In one embodiment, the thickness of the third layer is in the range of about 10 nanometers to 2000 nanometers. In one embodiment, the thickness is in the range of about 50 nanometers to 1000 nanometers. In one embodiment, the thickness is in the range of about 100 nanometers to 500 nanometers.

The anode of the present invention may further comprise a fourth layer in contact with a surface of the third layer on the side opposite to the anode active layer or intermediate layer. A fourth layer may be desirable when the components of the third layer, which functions to stabilize or protect the anode active layer comprising lithium, may be unstable to components present in the electrolyte. This fourth layer should be conductive to lithium ions, preferably nonporous to prevent penetration by electrolyte solvents, compatible with electrolyte and the third layer, and flexible enough to accommodate for volume changes in the layers occurring during discharge and charge. The fourth layer should further be insoluble in the electrolyte. As the fourth layer is not directly in contact with the lithium layer, compatibility with metallic lithium is not necessary. Examples of suitable fourth layers include, but are not limited to, organic or inorganic solid polymer electrolytes, electrically and ionically conducting polymers, and metals with certain lithium solubility properties. In one embodiment, the fourth layer comprises a polymer layer, wherein the fourth layer is in contact with the third layer on the side opposite to said second layer. In one embodiment, the polymer of the fourth layer is selected from the group consisting of electrically conductive polymers, ionically conductive polymers, sulfonated polymers, and hydrocarbon polymers. Further examples of suitable polymers for use in the fourth layer of the present invention are those described in U.S. patent application Ser. No. 09/399,967, now U.S. Pat. No. 6,183,901 B1, to Ying et al. of the common assignee for protective coating layers, the disclosures of which are fully incorporated herein by reference.

The thickness of the fourth layer, which may be the outer layer of the anode layer, of the anode of the present invention is similar to that of the third layer and may vary over a wide range from about 5 to about 5000 nanometers. The thickness of the fourth layer is dependent on the thickness of the layer required to provide the desired beneficial effect of the layer while maintaining properties needed for cell construction, such as flexibility, low interfacial resistance, and stability to the electrolyte. In one embodiment, the thickness of the fourth layer is in the range of about 10 nanometers to 2000 nanometers. In one embodiment, the thickness of the fourth layer is in the range of about 10 nanometers to 1000 nanometers. In one embodiment, the thickness of the fourth layer is in the range of about 50 nanometers to 1000 nanometers. In one embodiment, the thickness of the fourth layer is in the range of about 100 nanometers to 500 nanometers.

Figure 2:
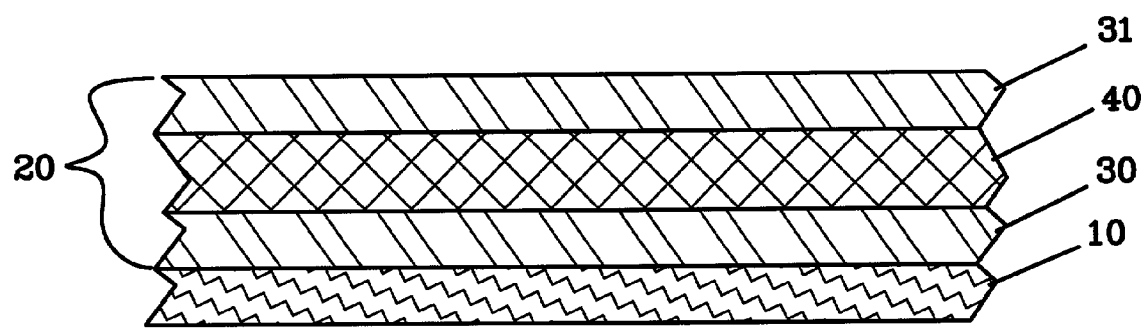
FIG. 2 shows a sectional view of one embodiment of the anode of the present invention comprising (a) a first layer 10 comprising lithium metal, and (b) a multi-layer structure 20 comprising a polymer layer 30, a single ion conducting layer 40, and a polymer layer 31.

In a preferred embodiment of the present invention, the anode comprises a multilayered structure in contact with a surface of the first anode active layer comprising lithium metal, wherein the multi-layered structure comprises three or more layers, and wherein the multi-layered structure comprises one or more single ion conducting layers and one or more polymer layers. Various embodiments of the present invention are illustrated in FIGS. 1–5, which are not drawn to scale. In one embodiment, the multi-layered structure comprises alternating single ion conducting layers and polymer layers, as illustrated in FIGS. 1, 2, and 4.

For example, a three layer multi-layer structure may comprise a first single ion conducting layer 40 in contact with a surface of the first anode active layer comprising lithium metal 10, a polymer layer 30 in contact with a surface of the first single ion conducting layer 40, and a second single ion conducting layer 41 in contact with the surface of the polymer layer 30, as illustrated in FIG. 1.

More preferably, for example, a three layer multi-layer structure may comprise a first polymer layer 30 in contact with a surface of the first anode active layer comprising lithium metal 10, a single ion conducting layer 40 in contact with the first polymer layer 30, and a second polymer layer 31 in contact with the single ion conducting layer 40, as illustrated in FIG. 2.

In one embodiment, the multi-layer structure comprises three or more layers, wherein the multi-layered structure comprises one or more single ion conducting layers and one or more polymer layers. In another embodiment, the multi-layer structures comprise four or more layers, wherein the multi-layered structure comprises one or more single ion conducting layers and one or more polymer layers. In yet another embodiment, the multilayered structure comprises five or more layers, as illustrated in FIG. 4.

The thickness of the multi-layer structure of the present invention may vary over a range from about 0.5 microns to about 10 microns. In a preferred embodiment, the thickness of the multi-layer structure may range from about 1 micron to about 5 microns.

The thickness of each layer of the multilayer structure of the anode of the present invention is similar to those of the third or fourth layer and may vary over a wide range from about 5 to about 5000 nanometers. The thickness of each layer is dependent on the thickness of the layer required to provide the desired beneficial effect of the layer while maintaining properties needed for cell construction, such as flexibility, low interfacial resistance, and stability to the electrolyte. In one embodiment, the thickness of the each layer is in the range of about 10 nanometers to 2000 nanometers. In one embodiment, the thickness of each layer is in the range of about 10 nanometers to 1000 nanometers. In one embodiment, the thickness of the each layer is in the range of about 50 nanometers to 1000 nanometers. In one embodiment, the thickness of each layer is in the range of about 100 nanometers to 500 nanometers.

The single ion conductivity of each layer of the multilayer may vary over a wide range. Preferably, the single ion conductivity of each layer is greater than $10^{-7}$ $ohm^{-1}$ $cm^{-1}$. However, when very thin layers are used the ion conductivity may less.

Suitable single ion conducting layers for use in the anodes of the present invention include, but are not limited to, inorganic, organic, and mixed organic-inorganic polymeric materials. The term "single ion conducting layer," as used herein, pertains to a layer which selectively or exclusively allows passage of singly charged cations. Single ion conducting layers have the capability of selectively or exclusively transporting cations, such as lithium ions, and may comprise polymers such as, for example, disclosed in U.S. Pat. No. 5,731,104 to Ventura, et al. In one embodiment, the single ion conducting layer comprises a single ion conducting glass conductive to lithium ions. Among the suitable glasses are those that may be characterized as containing a "modifier" portion and a "network" portion, as known in the art. The modifier is typically a metal oxide of the metal ion conductive in the glass. The network former is typically a metal chalcogenide, such as for example, a metal oxide or sulfide.

Preferred single ion conducting layers for use in the anodes of the present invention include, but are not limited to, glassy layers comprising a glassy material selected from the group consisting of lithium silicates, lithium borates, lithium aluminates, lithium phosphates, lithium phosphorus oxynitrides, lithium silicosulfides, lithium germanosulfides, lithium lanthanum oxides, lithium titanium oxides, lithium borosulfides, lithium aluminosulfides, and lithium phosphosulfides, and combinations thereof. In one embodiment, the single ion conducting layer comprises a lithium phosphorus oxynitride. Electrolyte films of lithium phosphorus oxynitride are disclosed, for example, in U.S. Pat. No. 5,569,520 to Bates. A thin film layer of lithium phosphorus oxynitride interposed between a lithium anode and an electrolyte is disclosed, for example, in U.S. Pat. No. 5,314,765 to Bates. The selection of the single ion conducting layer will be dependent on a number of factors including, but not limited to, the properties of electrolyte and cathode used in the cell.

Suitable polymer layers for use in the anodes of the present invention, include, but are not limited to, those selected from the group consisting of electrically conductive polymers, ionically conductive polymers, sulfonated polymers, and hydrocarbon polymers. The selection of the polymer will be dependent on a number of factors including, but not limited to, the properties of electrolyte and cathode used in the cell. Suitable electrically conductive polymers include, but are not limited to, those described in U.S. Pat. No. 5,648,187 to Skotheim, for example, including, but not limited to, poly(p-phenylene), polyacetylene, poly(phenylenevinylene), polyazulene, poly(perinaphthalene), polyacenes, and poly(naphthalene-2,6-diyl). Suitable ionically conductive polymers include, but are not limited to, ionically conductive polymers known to be useful in solid polymer electrolytes and gel polymer electrolytes for lithium electrochemical cells, such as, for example, polyethylene oxides. Suitable sulfonated polymers include, but are not limited to, sulfonated siloxane polymers, sulfonated polystyrene-ethylene-butylene polymers, and sulfonated polystyrene polymers. Suitable hydrocarbon polymers include, but are not limited to, ethylene-propylene polymers, polystyrene polymers, and the like.

Also preferred for the polymer layers of the multi-layered structure of the present invention, are crosslinked polymer materials formed from the polymerization of monomers including, but not limited to, alkyl acrylates, glycol acrylates, polyglycol acrylates, polyglycol vinyl ethers, polyglycol divinyl ethers, and those described in U.S. patent application Ser. No. 09/399,967, now U.S. Pat. No. 6,183,901 B1, to Ying et al. of the common assignee for protective coating layers for separator layers, the disclosures of which are fully incorporated herein by reference. For example, one such crosslinked polymer material is polydivinyl poly(ethylene glycol). The crosslinked polymer materials may further comprise salts, for example, lithium salts, to enhance ionic conductivity. In one embodiment, the polymer layer of the multi-layered structure comprises a crosslinked polymer. In one embodiment, a polymer layer is formed from the polymerization of one or more acrylate monomers selected from the group consisting of alkyl acrylates, glycol acrylates, and polyglycol acrylates.

The outer layer of the multi-layered structure, i.e. the layer that is in contact with the electrolyte or separator layer of the cell, should be selected for properties such as protection of underlying layers which may be unstable to components present in the electrolyte. This outer layer should be conductive to lithium ions, preferably nonporous to prevent penetration by electrolyte solvents, compatible with electrolyte and the underlying layers, and flexible enough to accommodate for volume changes in the layers observed during discharge and charge. The outer layer should further be stable and preferably insoluble in the electrolyte.

Examples of suitable outer layers include, but are not limited to, organic or inorganic solid polymer electrolytes, electrically and ionically conducting polymers, and metals with certain lithium solubility properties. In one embodiment, the polymer of the outer layer is selected from the group consisting of electrically conductive polymers, ionically conductive polymers, sulfonated polymers, and hydrocarbon polymers. Further examples of suitable polymers for use in the outer layer of the present invention are those described in U.S. patent application Ser. No. 09/399,967, now U.S. Pat. No. 6,183,901 B1, to Ying et al. of the common assignee for protective coating layers of coated separators.

In one embodiment of the present invention, the multi-layer structure may further comprise a metal alloy layer. The term "metal alloy layer," as used herein, pertains to lithiated metal alloy layers. The lithium content of the metal alloy layer may vary from about 0.5% by weight to about 20% by weight, depending, for example, on the specific choice of metal, the desired lithium ion conductivity, and the desired flexibility of the metal alloy layer. Suitable metals for use in the metal alloy layer include, but are not limited to, Al, Zn, Mg, Ag, Pb, Cd, Bi, Ga, In, Ge, and Sn. Preferred metals are, Zn, Mg, Sn, and Al. In one embodiment, the metal alloy comprises a metal selected from the group consisting of Zn, Mg, Sn, and Al.

The thickness of the metal alloy layer may vary over a range from about 10 nm to about 1000 nm (1 micron). In one embodiment, the thickness of the metal alloy layer is about 10 to 1000 nanometers. In one embodiment, the thickness of the metal alloy layer is about 20 to 500 nanometers. In one embodiment, the thickness of the metal alloy layer is about 20 to 500 nanometers. In one embodiment, the thickness of the metal alloy layer is about 50 to 200 nanometers.

Figure 3:
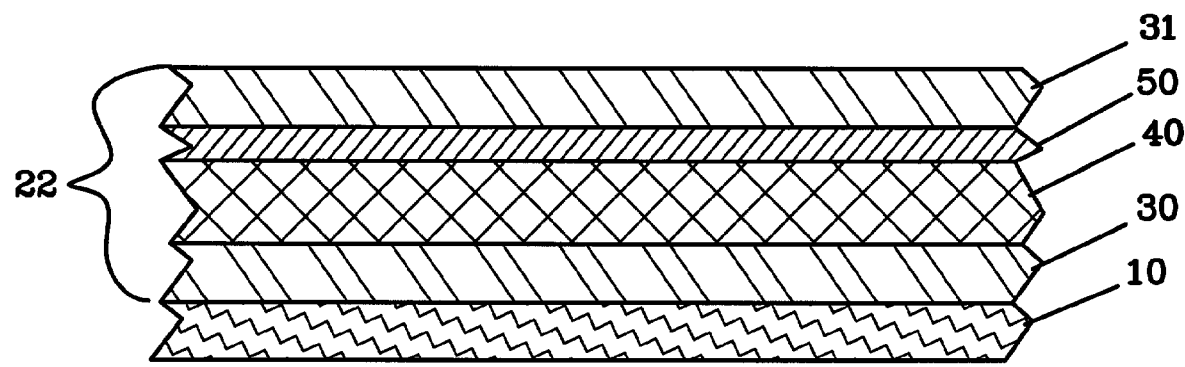
FIG. 3 shows a sectional view of one embodiment of the anode of the present invention comprising (a) a first layer 10 comprising lithium metal, and (b) a multi-layer structure 22 comprising a polymer layer 30, a single ion conducting layer 40, metal layer 50, and a polymer layer 31.
Figure 4:
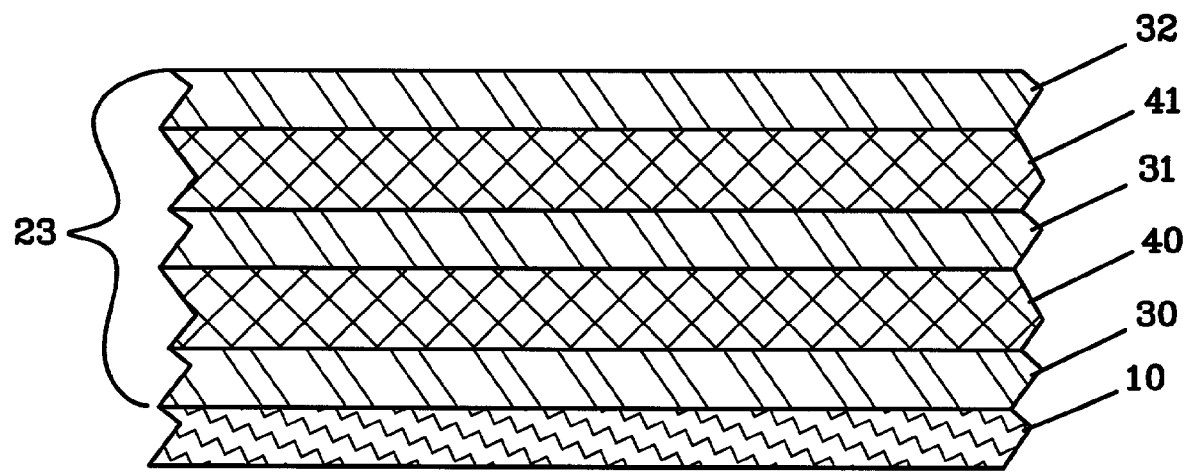
FIG. 4 shows a sectional view of one embodiment of the anode of the present invention comprising (a) a first layer 10 comprising lithium metal, and (b) a multi-layer structure 23 comprising a polymer layer 30, a single ion conducting layer 40, a polymer layer 31, a single ion conducting layer 41, and a polymer layer 32.

The metal alloy layer may be placed between polymer layers, between ion conducting layers, or between an ion conducting layer and a polymer layer, as illustrated in FIG. 3. For example, in FIG. 3 a multi-layer structure is shown comprising (a) a first layer 10 comprising lithium metal, and (b) a multi-layer structure 22 comprising a polymer layer 30, a single ion conducting layer 40, metal layer 50, and a polymer layer 31. In one embodiment, the metal alloy layer is interposed between a polymer layer and an ion-conducting layer or two polymer layers, or two ion-conducting layers. In one embodiment, the metal alloy layer is the outer layer of the multi-layered structure.

Figure 5:
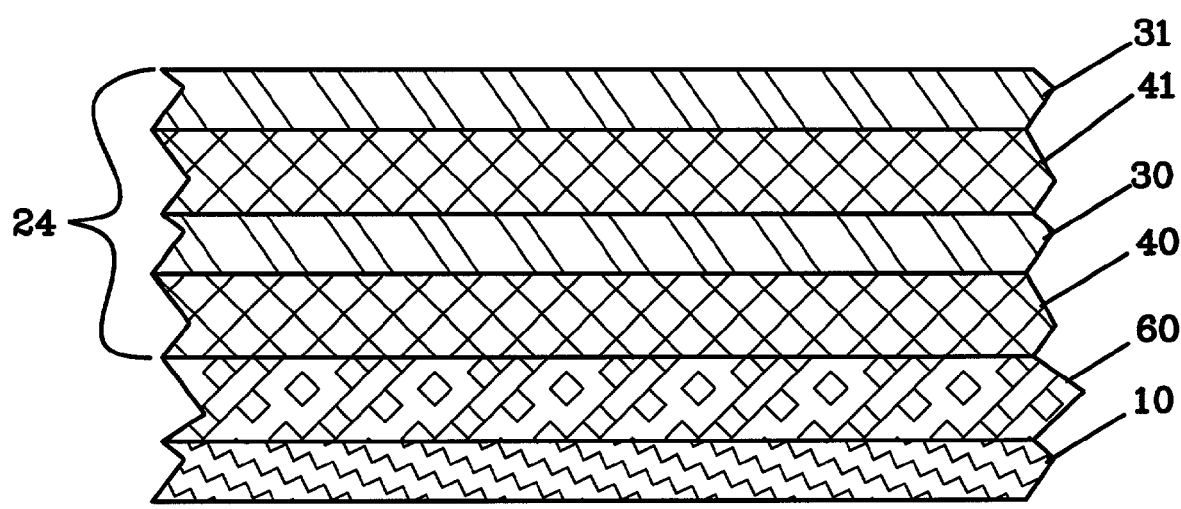
FIG. 5 shows a sectional view of one embodiment of the anode of the present invention comprising (a) a first layer 10 comprising lithium metal, (b) a surface reacted layer 60, and (c) a multi-layer structure 24 comprising a single ion conducting layer 40, a polymer layer 30, a single ion conducting layer 41, and a polymer layer 31.

The anode of the present invention may have the multi-layer structure comprising three or more layers in contact with a surface of the first anode active layer comprising lithium metal, or in contact with a surface of a second or intermediate temporary protective metal layer, or in contact with a surface or intermediate layer on the first anode active layer, such as, for example, from reaction with $CO_2$ or $SO_2$. In one embodiment of the present invention, the multi-layer structure is formed on a surface of the first anode active layer comprising lithium metal. In one embodiment of the present invention, a multi-layer structure is formed on a surface of an intermediate layer on the side opposite to the anode active layer. In one embodiment of the present invention, a layer from the reaction of the first anode active layer comprising lithium metal with $CO_2$ or $SO_2$ is interposed between the multi-layer structure and the first anode active layer comprising lithium metal, wherein the multi-layer structure is formed on a surface of the reacted layer 60, as illustrated in FIG. 5.

Multi-layer structures of the present invention possess properties superior to those of the individual layers which comprise the multi-layer. Each of the layers of the multi-layer structure, for example, the single ion conducting layers, the polymer layers, and the metal alloy layers, possess desirable properties but at the same time possess certain undesirable properties. For example, single ion conducting layers, especially vacuum deposited single ion conducting layers, are flexible as thin films but as they become thicker grow defects, such as pinholes and rougher surfaces. Metal alloy layers, for example, may block liquid and polysulfide migration, and are very ductile and flexible in thin film form but may interdiffuse with lithium and are electron conducting. Polymer layers and especially crosslinked polymer layers, for example, can provide very smooth surfaces, add strength and flexibility, and may be electron insulating. In the multi-layer structures of the present invention comprising three or more layers comprising one or more single ion conducting layers and one or more polymer layers, and optionally one or more metal alloy layers, it is possible to obtain essentially defect free structures. For example, a crosslinked polymer layer deposited over a single ion conducting layer may smooth the surface and thereby minimize defects in subsequent single ion conducting layers deposited upon it. The crosslinked polymer layer may be viewed as decoupling defects in layers on either side of it. Although the multi-layer structures consisting of three layers are effective in defect reduction of the anode interfacial layer, additional benefit may be gained from four or more layers. The benefits of a defect free layer or structure include efficient exclusion of undesirable species from the lithium surface, which can lead to dendrite formation, self discharge, and loss of cycle life. Other benefits of the multi-layer structure include an increased tolerance of the volumetric changes which accompany the migration of lithium back and forth from the anode during the cycles of discharge and charge of the cell, and improved robustness to withstand stresses during manufacturing processes.

The anodes of the present invention may be assembled into cells by combining with an electrolyte and a cathode comprising a cathode active material, as described herein. The anodes may also be formed with other alkali or alkaline earth metal anode active materials by suitable choice of the multi-layered structure, and if desired by the presence of a temporary protective metal layer or other intermediate layer between the anode active layer and the multi-layered structure.

Methods of Making Anodes

Another aspect of the present invention pertains to a method of preparing an anode for use in an electrochemical cell, wherein the anode comprises: (i) a first anode active layer comprising lithium metal; and (ii) a multi-layer structure in contact with a surface layer of the first anode active layer; wherein the multi-layer structure comprises three or more layers, wherein each of the layers comprises a single ion conducting layer or a polymer layer, as described herein.

In one embodiment, the method of making an anode for an electrochemical cell comprises the steps of:

(a) depositing onto a substrate a first anode active layer comprising lithium metal, or providing a lithium metal foil as a first anode active layer;

(b) depositing over the first anode active layer a first layer comprising a polymer or a single ion conducting layer;

(c) depositing over the first layer of step (b) a second layer comprising a single ion conducting layer if the layer of step (b) is a polymer, or a polymer layer if the layer of step (b) is a single ion conducting layer; and (d) depositing over the second layer of step (c) a third layer comprising a single ion conducting layer if the layer of step (c) is a polymer, or a polymer layer if the layer of step (c) is a single ion conducting layer to form an anode comprising:

(i) a first anode active layer comprising lithium metal; and
(ii) a multi-layer structure in contact with a surface layer of the first anode active layer; wherein the multi-layer structure comprises three or more layers, wherein each of the layers comprises a single ion conducting layer or a polymer layer.

The order of the deposition of the polymer and single ion conducting layer will depend on the desired properties of the multi-layered structure. It may also be desirable to deposit two or more polymer layers or two or more single ion conducting layers that are in contact with each other. A metal alloy layer may be deposited subsequent to step (b). Such a metal alloy layer may be deposited between a polymer layer and a single ion conducting layer or between two polymer layers, or between two single ion conducting layers. A metal alloy layer may also be deposited as the outer most layer of the multi-layer structure.

Another aspect of the present invention pertains to a method of preparing an anode for use in an electrochemical cell, wherein the anode comprises:

(i) a first anode active layer comprising lithium metal; and
(ii) a multi-layer structure in contact with a surface layer of the first anode active layer;

wherein the multi-layer structure comprises three or more layers, wherein each of said layers comprises a single ion conducting layer or a polymer layer, and is formed by the method comprising the steps of:

(a) depositing onto a substrate a first anode active layer comprising lithium metal, or alternatively, providing a lithium metal foil as a first anode active layer;

(b) depositing over the first anode active layer a polymerizable monomer layer;

(c) polymerizing the monomer layer of step (b) to form a first polymer layer;

(d) depositing over the polymer layer of step (c) a first single ion conducting layer;

(e) depositing over the first single ion conducting layer of step (d) a second polymerizable monomer layer; and (f) polymerizing the monomer layer of step (e) to form a second polymer layer to form a multi-layer structure comprising a single ion conducting layer and two polymer layers.

The methods of the present invention may further comprise, subsequent to step (a) and prior to step (b), the step of treating the first anode active layer comprising lithium metal with $CO_2$ or $SO_2$ or other gaseous material, or depositing a layer of a temporary protective material, such as a temporary protective metal, as described herein.

The method of the present invention may further comprise, subsequent to step (f), repeating the steps (d), or (d), (e) and (f) one or more times to form a multi-layer structure comprising four or more layers.

Similarly, multi-layered structures may be formed by depositing over a first anode active layer a first layer of a single ion conducting layer, followed by a first polymer layer, and subsequently a second ion conducting layer.

If a metal alloy layer is desired in the multi-layered structure, this may be deposited after any one of steps (c), (d), or (f).

As described herein, the polymer layers are preferably cross-linked polymer layers. In one embodiment, the polymer layers of said multi-layer structure comprise a polymer layer formed from the polymerization of one or more acrylate monomers selected from the group consisting of alkyl acrylates, glycol acrylates, and polyglycol acrylates.

In the method of the present invention, the polymerizable monomer layer of steps (b) and (e) may comprise dissolved lithium salts. Other additives, such as, for example, uv-curing agents, may also be added to the polymerizable monomer layer.

In another embodiment of the methods of the present invention for preparing an anode for use in an electrochemical cell, wherein the anode comprises:

(i) a first anode active layer comprising lithium metal; and (ii) a multi-layer structure in contact with a surface layer of the first anode active layer;

wherein the multi-layer structure comprises three or more layers, wherein each of said layers comprises a single ion conducting layer or a polymer layer; the method comprises the steps of:

(a) depositing onto a substrate a first anode active layer comprising lithium metal, or alternatively, providing a lithium metal foil as a first anode active layer;

(b) depositing over the first anode active layer a first polymer layer;

(c) depositing over the polymer layer of step (b) a first single ion conducting layer; and (d) depositing over the first single ion conducting layer of step (c) a second polymer layer to form a multi-layer structure comprising a single ion conducting layer and two polymer layers.

In the method of the present invention, the polymer layer of steps (b) and (d) may comprise dissolved lithium salts. If a metal alloy layer is desired in the multi-layer structure, this may be deposited after step (c) or later step. Preferable, the polymer layers are crosslinked polymer layers.

Another aspect of the present invention pertains to a method of preparing an anode active layer comprising a temporary protective layer or intermediate layer for use in an electrochemical cell, wherein the anode active layer is formed by the steps of:

(a) depositing onto a substrate a first anode active layer comprising lithium metal, or alternatively, providing a lithium metal foil as a first anode active layer; and (b) depositing over the first anode active layer a temporary protective layer or intermediate layer.

Alternatively, step (b) may comprise treating or reacting the surface of the first anode active layer comprising lithium or lithium foil with a reactive gaseous material, such as, for example $CO_2$. In one embodiment of the methods of the present invention, the anode active layer comprising lithium is treated with a $CO_2$ plasma.

Another aspect of the present invention pertains to a method of preparing an anode active layer comprising a temporary protective metal layer for use in an electrochemical cell, wherein the anode active layer is formed by the steps of:

(a) depositing onto a substrate a first anode active layer comprising lithium metal, or alternatively, providing a lithium metal foil as a first anode active layer; and (b) depositing over the first anode active layer a second layer of a temporary protective metal, wherein the temporary protective metal is selected from the group consisting of copper, magnesium, aluminum, silver, gold, lead, cadmium, bismuth, indium, gallium, germanium, zinc, tin, and platinum; and wherein the temporary protective metal is capable of forming an alloy with lithium metal or diffusing into lithium metal.

The method of forming an anode active layer comprising a temporary protective layer of the present invention, may further comprise after step (b), a step (c) of depositing a third layer over the second layer formed in step (b), wherein the third layer comprises a single ion conducting layer, as described herein, or a polymer, as described herein. The method may further comprise after step (c), a step (d) of depositing a fourth layer over the third layer, wherein the fourth layer comprises a polymer. Further polymer or single ion conducting layers may be deposited to form a multi-layer structure as described herein.

The layers of the anode of the present invention may be deposited by any of the methods known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation. Many vacuum apparatus designs and deposition processes have been described for the deposition of materials on polymer films. For example, Witzman et al., in U.S. Pat. No. 6,202,591 B1, and references cited therein describe apparatus and coating process for the deposition of materials on polymer films.

Preferably the deposition of the layers of the anode of the present invention are carried out in a vacuum or inert atmosphere to minimize side reactions in the deposited layers which would introduce impurities into the layers or which may affect the desired morphology of the layers. It is preferable that anode active layer and the layers of the multi-layered structure are deposited in a continuous fashion in a multistage deposition apparatus. If the anode active layer comprises a temporary protective metal layer, this layer is capable of providing protection for the anode active layer if the layers of the multi-layered structure are deposited in a different apparatus.

Suitable methods for depositing the temporary protective metal layer include, but are not limited to, thermal evaporation, sputtering, jet vapor deposition, and laser ablation. In one embodiment, the temporary protective metal layer is deposited by thermal evaporation or sputtering.

The layers of the multi-layered structure comprising a single ion conducting layer or a polymer layer may be deposited from either precursor moieties or from the material of the layer, as known in the art for forming such materials.

In one embodiment, the single ion conducting layer is deposited by a method selected from the group consisting of sputtering, electron beam evaporation, vacuum thermal evaporation, laser ablation, chemical vapor deposition, thermal evaporation, plasma enhanced chemical vacuum deposition, laser enhanced chemical vapor deposition, and jet vapor deposition.

In one embodiment, the polymer layer is deposited by a method selected from the group consisting of electron beam evaporation, vacuum thermal evaporation, laser ablation, chemical vapor deposition, thermal evaporation, plasma assisted chemical vacuum deposition, laser enhanced chemical vapor deposition, jet vapor deposition, and extrusion. The polymer layer may also be deposited by spin-coating methods or flash evaporation methods. Flash evaporation methods are particularly useful for deposition of crosslinked polymer layers.

A preferred method for deposition of crosslinked polymer layers is a flash evaporation method, for example, as described in U.S. Pat. No. 4,954,371 to Yializis. A preferred method for deposition of crosslinked polymer layers comprising lithium salts is a flash evaporation method, for example, as described in U.S. Pat. No. 5,681,615 to Affinito et al.

Preferred methods for the deposition of the first anode active layer comprising lithium metal on to a substrate are those selected from the group consisting of thermal evaporation, sputtering, jet vapor deposition, and laser ablation. In one embodiment, the first layer is deposited by thermal evaporation. Alternatively, the first anode active layer may comprise a lithium foil, or a lithium foil and a substrate, which may be laminated together by a lamination process as known in the art, to form the first layer.

In another aspect of the present invention, the anode active layer comprising lithium may be formed by co-depositing in-situ lithium with one or more gaseous materials onto a substrate. The term "co-deposited," as used herein, pertains to a process in which gaseous material or reaction products of gaseous material and lithium, are deposited in-situ onto a substrate with lithium. Co-deposition may be different from first depositing and cooling a lithium film and then post-treating by depositing another layer or reacting with another gaseous material. The term "gaseous material," as used herein, pertains to a material which is in the form of a gas under the conditions of temperature and pressure at which the deposition occurs. For example, a material may be a liquid at ambient temperature and pressure, but be in gaseous form under conditions of vapor deposition.

In one embodiment of the present invention, lithium vapor from the deposition source is co-deposited on the substrate in presence of a gaseous material. In one embodiment, lithium vapor from a deposition source is co-deposited on a substrate in the presence of a material from a plasma or from an ion gun. In one embodiment, lithium vapor from the deposition source is condensed onto the substrate and the deposited lithium immediately treated with a gaseous material. In one embodiment, lithium vapor from the deposition source is co-deposited on the substrate in presence of a gaseous material and the deposited lithium immediately treated with a gaseous material. In another embodiment of the present invention, the method employs multiple depositions of lithium vapor, each co-deposited in the presence of a gaseous material by means of multiple passes of the substrate by the deposition source.

Suitable gaseous materials include but are not limited to carbon dioxide, acetylene, nitrogen, ethylene, sulfur dioxide, and hydrocarbons. Suitable materials for co-deposition from a plasma source include, but are not limited to, carbon dioxide, acetylene, nitrogen, ethylene, sulfur dioxide, hydrocarbons, alkyl phosphate esters, alkyl sulfite esters, and alkyl sulfate esters. Preferred gaseous materials are carbon dioxide and acetylene. Most preferred gaseous material is carbon dioxide. The amount of gaseous material co-deposited with the lithium may vary over a wide range. Preferably the amount of the gaseous material co-deposited with the lithium is between 0.2% and 5.0% by weight of the lithium. Higher amounts of gaseous material may result in undesirable insulative deposits of carbonaceous materials on the lithium surface.

The anode active layers formed by the co-deposition in-situ of lithium and a gaseous material may be deposited by methods such as, for example, physical deposition methods and plasma assisted deposition methods. The co-deposition of the gaseous material may be accomplished, for example, by introduction of the gaseous material adjacent to the lithium source in the deposition chamber.

While not wishing to be bound by theory, it is believed that co-deposition of lithium with gaseous material, for example carbon dioxide or acetylene, incorporates carbonaceous material in and/or on the deposited lithium. Carbon dioxide can form a number of products upon reaction with lithium. For example, Zhuang et al., in *Surface Science*, 1998, 418, 139–149, report that the interaction of carbon dioxide with clean lithium at 320° K produces a mixture of species including elemental carbon, a limited amount of $CO_2^{2-}$ (carbonate), and $O_{2-}$ (oxide). It is noted that the exact composition and ratio of products is temperature dependent. The co-deposition processes of lithium and carbon dioxide may produce a lithium layer with a surface layer comprising elemental carbon, oxide, and carbonate. The co-deposition processes of lithium and carbon dioxide may produce a lithium layer in which elemental carbon, oxide, and carbonate are intimately dispersed or the co-deposition process may produce both intimately dispersed elemental carbon, oxide, and carbonate and a surface layer comprising these components.

The co-deposition process(es) provide suitable methods for the formation of a surface layer formed on the first anode active layer comprising lithium from the reaction of, for example $CO_2$, which is interposed between the multi-layer structure and the first anode active layer comprising lithium.

Electrochemical Cells

The anodes of the present invention, as described herein, may be used in both primary and secondary lithium cells of a variety of chemistries.

In one embodiment, the anode of the electrochemical cells of the present invention comprises a co-deposited lithium anode active layer formed in-situ by the co-deposition of lithium and a gaseous material, as described herein.

In one aspect, the present invention provides an electrochemical cell comprising:

(a) a cathode comprising a cathode active material;

(b) an anode; and (c) a non-aqueous electrolyte interposed between the anode and the cathode, wherein the anode comprises:

(i) a first anode active layer comprising lithium metal, as described herein; and (ii) a multi-layer structure, as described herein, in contact with a surface layer of the first layer; wherein the multi-layer structure comprises three or more layers wherein each of the three or more layers comprises a layer selected from the group consisting of single ion conducting layers and polymer layers.

In a preferred embodiment, the cathode comprises an electroactive sulfur-containing material.

In one embodiment, the first anode active layer of the cell further comprises an intermediate layer, wherein the intermediate layer is interposed between the first anode active layer and the multi-layered structure. In one embodiment, the intermediate layer is selected from the group consisting of temporary protective metal layers and plasma $CO_2$ treatment layers.

In one embodiment, the first anode active layer is a co-deposited lithium anode active layer, as described herein.

In another aspect, the present invention provides an electrochemical cell comprising:

(a) a cathode comprising a cathode active material;

(b) an anode; and (c) a non-aqueous electrolyte interposed between the cathode and the anode;

wherein the anode comprises an anode active layer, which anode active layer comprises:

(i) a first layer comprising lithium metal;

(ii) a second layer of a temporary protective material, as described herein, in contact with a surface of said first layer; and (iii) a multi-layer structure in contact with a surface of the second layer.

In one embodiment, the present invention provides an electrochemical cell comprising:

(a) a cathode comprising a cathode active material;

(b) an anode; and (c) a non-aqueous electrolyte interposed between the cathode and the anode.

wherein the anode comprises an anode active layer, which anode active layer comprises:

(i) a first layer comprising lithium metal;

(ii) a second layer of a temporary protective metal in contact with a surface of the first layer; and (iii) a multi-layer structure in contact with a surface of the second layer;

wherein the temporary protective metal is capable of forming an alloy with lithium metal or is capable of diffusing into lithium metal.

In one embodiment, the metal of the temporary protective layer is selected from the group copper, magnesium, aluminum, silver, gold, lead, cadmium, bismuth, indium, gallium, germanium, zinc, tin, and platinum.

The temporary protective metal layer of the anode active layer may alloy with, diffuse with, dissolve into, blend with, or diffuse into with the lithium metal of the first layer prior to the electrochemical cycling cell or during the electrochemical cycling of a cell.

Suitable cathode active materials for use in the cathode of the electrochemical cells of the present invention include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

The term "electroactive sulfur-containing material," as used herein, relates to cathode active materials which comprise the element sulfur in any form, wherein the electrochemical activity involves the breaking or forming of sulfur-sulfur covalent bonds. Suitable electroactive sulfur-containing materials, include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In one embodiment, the sulfur-containing material, in its oxidized form, comprises a polysulfide moiety, $S_m$, selected from the group consisting of covalent $—S_m—$ moieties, ionic $—S_m^-$ moieties, and ionic $S_m^{2-}$ moieties, wherein m is an integer equal to or greater than 3. In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing material is a sulfur-containing polymer. In one embodiment, the sulfur-containing polymer has a polymer backbone chain and the polysulfide moiety, $S_m$, is covalently bonded by one or both of its terminal sulfur atoms as a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

In one embodiment, the electroactive sulfur-containing material comprises greater than 50% by weight of sulfur. In a preferred embodiment, the electroactive sulfur-containing material comprises greater than 75% by weight of sulfur. In a more preferred embodiment, the electroactive sulfur-containing material comprises greater than 90% by weight of sulfur.

The nature of the electroactive sulfur-containing materials useful in the practice of this invention may vary widely, as known in the art.

In one embodiment, the electroactive sulfur-containing material comprises elemental sulfur. In one embodiment, the electroactive sulfur-containing material comprises a mixture of elemental sulfur and a sulfur-containing polymer.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; and U.S. Pat. application Ser. No. 08/995,122, now U.S. Pat. No. 6,201,100, to Gorkovenko et al. of the common assignee and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The cathodes of the cells of the present invention may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, carbon fabrics, metal mesh, and electrically conductive polymers. The amount of conductive filler, if present, is preferably in the range of 2 to 30% by weight of the cathode active layer. The cathodes may also further comprise other additives including, but not limited to, metal oxides, aluminas, silicas, and transition metal chalcogenides.

The cathodes of the cells of the present invention may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. The amount of binder, if present, is preferably in the range of 2 to 30% by weight of the cathode active layer.

The cathodes of the cells of the present invention may further comprise a current collector as is known in the art. Current collectors are useful in efficiently collecting the electrical current generated throughout the cathode and in providing an efficient surface for attachment of the electrical contacts leading to the external circuit as well as functioning as a support for the cathode. Examples of useful current collectors include, but are not limited to, those selected from the group consisting of metallized plastic films, metal foils, metal grids, expanded metal grids, metal mesh, metal wool, woven carbon fabric, woven carbon mesh, non-woven carbon mesh, and carbon felt.

Cathodes of the cells of the present invention may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler, binder, or other cathode additives; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode.

Examples of suitable liquid media for the preparation of the cathodes of the present invention include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art, so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to substrates by any of a variety of coating methods known in the art and then dried using techniques, known in the art, to form the solid cathodes of the lithium cells of this invention. Suitable hand coating techniques include, but are not limited to, the use of a wire-wound coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of means known in the art. Examples of suitable methods for the removal of liquid from the mixture include, but are not limited to, hot air convection, heat, infrared radiation, flowing gases, vacuum, reduced pressure, and by simply air drying.

The method of preparing the cathodes of the present invention may further comprise heating the electroactive sulfur-containing material to a temperature above its melting point and then resolidifying the melted electroactive sulfur-containing material to form a cathode active layer having a reduced thickness and a redistributed sulfur-containing material of higher volumetric density than before the melting process.

The electrolytes used in electrochemical or battery cells function as a medium for the storage and transport of ions, and in the special case of solid electrolytes and gel electrolytes, these materials may additionally function as a separator between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes. Examples of non-aqueous electrolytes for lithium batteries are described by Dominey in *Lithium Batteries, New Materials, Developments and Perspectives*, Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives,* Chapter 3, pp. 93–136, Elsevier, Amsterdam (1994). In one embodiment of the cells of the present invention, the non-aqueous electrolyte is a liquid electrolyte.

Examples of useful non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

Liquid electrolyte solvents are also useful as plasticizers for gel polymer electrolytes. Examples of useful gel polymer electrolytes include, but are not limited to, those comprising one or more polymers selected from the group consisting of polyethylene oxides, polypropylene oxides, polyacrylonitriles, polysiloxanes, polyimides, polyphosphazenes, polyethers, sulfonated polyimides, perfluorinated membranes (NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing, and optionally, one or more plasticizers.

Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming non-aqueous electrolytes, the non-aqueous electrolyte may further comprise one or more ionic electrolyte salts, also as known in the art, to increase the ionic conductivity.

Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts useful in the practice of this invention include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, and LiC(SO$_2$CF$_3$)$_3$.

The electrochemical cells of the present invention may further comprise a separator interposed between the cathode and anode. Typically, the separator is a solid non-conductive or insulative material which separates or insulates the anode and the cathode from each other preventing short circuiting, and which permits the transport of ions between the anode and the cathode.

The pores of the separator may be partially or substantially filled with electrolyte. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. patent application Ser. No. 08/995,089, now U.S. Pat. No. 6,153,337, and U.S. patent application Ser. No. 09/215,112 by Carlson et al. of the common assignee, the disclosures of which are fully incorporated herein by reference. Solid electrolytes and gel electrolytes may also function as a separator in addition to their electrolyte function.

In one embodiment, the solid porous separator is a porous polyolefin separator. In one embodiment, the solid porous separator comprises a microporous xerogel layer. In one embodiment, the solid porous separator comprises a microporous pseudo-boehmite layer.

Battery cells of the present invention may be made in a variety of sizes and configurations as known to those skilled in the art. These battery design configurations include, but are not limited to, planar, prismatic, jelly roll, w-fold, stacked, and the like.

The electrochemical cells comprising the anodes of the present invention may be either primary or secondary batteries or cells.

Another aspect of the present invention pertains to a method of forming an electrochemical cell, the method comprising the steps of: (i) providing a cathode; (ii) providing an anode, as described herein; and, (iii) interposing an electrolyte between the anode and the cathode.

EXAMPLES

Several embodiments of the present invention are described in the following examples, which are offered by way of illustration and not by way of limitation.

Example 1

A vacuum web coating system located in a dry room, having an unwind drive, liquid cooled drum at −20° C., load cell rollers for controlling tension, a rewind drive, and two deposition zones, was loaded with an anode substrate of 23 μm PET metallized on one side with 60 μm of inconel and of 15 cm width. The chamber was evacuated to 10$^{-6}$ Torr. Lithium was deposited on to the substrate by first heating a thermal evaporation lithium source to 535° C. to allow significant evaporation, and then starting the web drive at 0.5 feet per minute. The lithium evaporation was allowed to stabilize to give an 25 μm coating of lithium on the inconel of the substrate layer.

Example 2

A vacuum web coating system located in a dry room, having an unwind drive, liquid cooled drum at −20° C., load cell rollers for controlling tension, a rewind drive, and two deposition zones, was loaded with an anode substrate of 23 μm PET metallized on one side with 60 nm of inconel and of 15 cm width. The chamber was evacuated to 10$^{-6}$ Torr. Lithium was deposited on to the substrate by first heating a thermal evaporation lithium source to 535° C. to allow significant evaporation, and then starting the web drive at 0.5 feet per minute. The lithium evaporation was allowed to stabilize to give an 25 μm coating of lithium on the inconel of the substrate layer. Immediately adjacent to the lithium source CO$_2$ was introduced through a mass flow controller at a flow between 10 and 100 sccm raising the pressure to 0.1 to 50 mTorr. Dark discoloration was immediately seen in the co-deposited lithium with CO$_2$ from this in situ deposition process.

Example 3

A vacuum web coating system located in a dry room, having an unwind drive, liquid cooled drum at −20° C., load cell rollers for controlling tension, a rewind drive, and two deposition zones, was loaded with an anode substrate of 23 μm PET metallized on one side with 60 nm of inconel and of 15 cm width. The chamber was evacuated to 10$^{-6}$ Torr. Lithium was deposited on to the substrate by first heating a thermal evaporation lithium source to 535° C. to allow significant evaporation, and then starting the web drive at 0.5 feet per minute. The lithium evaporation was allowed to stabilize to give an 25 μm coating of lithium on the inconel of the substrate layer. Immediately adjacent to the lithium source RF magnetron plasma treatment with the CO$_2$ gas was performed. Forward RF power was between 50 and 100 W at a pressure of 0.1 to 50 mTorr. Dark discoloration was immediately seen in the co-deposited lithium with CO$_2$ from this in situ deposition process.

Example 4

A vacuum web coating system located in a dry room, having an unwind drive, liquid cooled drum at −20° C., load cell rollers for controlling tension, a rewind drive, and two deposition zones, was loaded with an anode substrate of 23

μm PET metallized on one side with 60 nm of inconel and of 15 cm width. The chamber was evacuated to $10^{-6}$ Torr. Lithium was deposited on to the substrate by first heating a thermal evaporation lithium source to 535° C. to allow significant evaporation, and then starting the web drive at 0.5 feet per minute. The lithium evaporation was allowed to stabilize to give an 25 μm coating of lithium on the inconel of the substrate layer. Immediately adjacent to the lithium source acetylene was introduced through a mass flow controller at a flow between 10 and 100 sccm raising the pressure to 0.1 to 50 mTorr. Dark discoloration was immediately seen in the co-deposited lithium with acetylene from this in situ deposition process.

Example 5

A vacuum web coating system located in a dry room, having an unwind drive, liquid cooled drum at −20° C., load cell rollers for controlling tension, a rewind drive, and two deposition zones, was loaded with an anode substrate of 23 μm PET metallized on one side with 60 nm of inconel and of 15 cm width. The chamber was evacuated to $10^{-6}$ Torr. Lithium was deposited on to the substrate by first heating a thermal evaporation lithium source to 535° C. to allow significant evaporation, and then starting the web drive at 0.5 feet per minute. The lithium evaporation was allowed to stabilize to give an 25 μm coating of lithium on the inconel of the substrate layer. Upon completion of the deposition the lithium coated substrate was re-wound on the unwind drive while the vacuum was maintained in the apparatus. With the lithium source off, the lithium coated substrate was subjected to RF magnetron plasma treatment with the $CO_2$ gas. Forward RF power was between 50 and 100 W at a pressure of 0.1 to 50 mTorr. The post treated lithium had a dark appearance.

Example 6

In situ co-deposited lithium with $CO_2$ was made by the method of Example 2. While still in the vacuum apparatus a 100 nm thick layer of Lipon was deposited on the surface of the co-deposited lithium by a RF sputtering source using a $Li_3PO_4$ target and 5 mTorr of $.N_2$ with 1000 W forward power.

Example 7

Small flat cells were assembled in the following way. A composite cathode was prepared by coating a 3.68 cm wide cathode active layer on a 4.19 cm wide Al/PET substrate. A cathode slurry was prepared from 70 parts by weight of elemental sulfur (available from Aldrich Chemical Company, Milwaukee, Wis.), 15 parts by weight of Printex XE-2 (a trade name for conductive carbon available from Degussa Corporation, Akron, Ohio), 10 parts by weight of graphite (available from Fluka/Sigma-Aldrich, Milwaukee, Wis.), 4 parts by weight of TA22-8 resin, and 1 part by weight of Ionac PFAZ-322. The solids content of the slurry was 14% by weight in a solvent mixture of 80% isopropanol, 12% water, 5% 1-methoxy-2-propanol and 3% dimethylethanolamine (on a weight basis). The slurry was coated by a slot die coater onto both sides of the substrate. The coating was dried in the ovens of the slot die coater. The resulting dry cathode active layer had a thickness of about 20 microns on each side of the current collector, with a loading of electroactive cathode material of about 1.15 mg/cm². 4.5 cm lengths of this composite cathode were used in building cells.

Lithium anodes of 10 cm in length and 4.19 cm in width were cut from the anode material of Example 1 Small flat cells were assembled by folding the anode around the cathode with a porous separator, 10 μm E25 SETELA (a trademark for a polyolefin separator available from Tonen Chemical Corporation, Tokyo, Japan, and also available from Mobil Chemical Company, Films Division, Pittsford, N.Y.) separator, inserted between anode and cathode. The cell was secured with ¼" wide polyimide tape and placed into a bag (package material consisting of polymer coated Aluminum foil available from Sealrite Films, San Leandro, Calif.). 0.4 mL of a 1.4 M solution of lithium bis(trifluoromethylsulfonyl)imide, (lithium imide, available from 3M Corporation, St. Paul, Minn.) in a 42:58 volume ratio mixture of 1,3-dioxolane and dimethoxyethane, was added as electrolyte and the cell was vacuum sealed. Testing was performed at a discharge current of 0.42 mA/cm² to a voltage of 1.5V and charged at a current 0.24 mA/cm² to 110% last half cycle capacity.

The discharge capacity at the $5^{th}$ cycle was 24 mAh and at the $40^{th}$ cycle was 22 mAh. The specific discharge capacity at the $40^{th}$ cycle was 514 mAh/g and at the $100^{th}$ cycle was 375 mAh/g.

Example 8

Small flat cells were made by the method of Example 7, except that co-deposited lithium anode material of Example 2 was used in place of lithium anode material of Example 1. Charging and discharging was performed as in Example 7.

The discharge capacity at the $5^{th}$ cycle was 28 mAh and at the $40^{th}$ cycle was 23 mAh. The specific discharge capacity at the $40^{th}$ cycle was 556 mAh/g and at the $100^{th}$ cycle was 432 mAh/g. The specific discharge capacity at 100 cycles was 115% of the specific discharge capacity of Example 7.

Example 9

Small flat cells were made by the method of Example 7, except that co-deposited lithium anode material of Example 4 was used in place of lithium anode material of Example 1. Charging and discharging was performed as in Example 7.

The discharge capacity at the $5^{th}$ cycle was 27 mAh and at the $40^{th}$ cycle was 24 mAh.

Example 10

Small flat cells were made by the method of Example 7, except that co-deposited lithium anode material of Example 5 was used in place of lithium anode material of Example 1. Charging and discharging was performed as in Example 7.

Example 11

Small flat cells were made by the method of Example 7, except that co-deposited lithium anode material of Example 6 was used in place of lithium anode material of Example 1. Charging and discharging was performed as in Example 7.

The specific discharge capacity at the $40^{th}$ cycle was 585 mAh/g and at the $100^{th}$ cycle was 456 mAh/g. The specific discharge capacity at 100 cycles was 121% of the specific discharge capacity of Example 7.

Example 12

A cathode with coated separator for making small flat cells was made as follows. A cathode was prepared by coating a mixture of 65 parts of elemental sulfur, 15 parts of a conductive carbon pigment PRINTEX XE-2, 15 parts of a graphite pigment (available from Fluka Chemical Company, Ronkonkoma, N.Y.), and 5 parts of fumed silica CAB-O-SIL EH-5 (a tradename for silica pigment available from Cabot Corporation, Tuscola, Ill.) dispersed in isopropanol onto a 17 micron thick conductive carbon coated aluminum coated PET substrate (available from Rexam Graphics, South Hadley, Mass.). After drying and calendering, the coated cathode active layer thickness was about 15–18 microns.

A coating mixture comprising 86 parts by weight (solid content) of DISPAL 11N7–12 (a trademark for boehmite sol available from CONDEA Vista Company, Houston, Tex.), 6 parts by weight (solid content) of AIRVOL 125 (a trademark for polyvinyl alcohol polymer available from Air Products, Inc., Allentown, Pa.), 3 parts by weight of polyethylene oxide (900,000 MW from Aldrich Chemical Company, Milwaukee, Wis.) and 5 parts by weight polyethylene oxide dimethylether, M-250, (Fluka Chemical Company, Ronkonkoma, N.Y.) in water was prepared. This coating mixture was coated directly on the cathode active layer above, followed by drying at 130° C.

A 5% by weight solution of a 3:2 ratio by weight of CD 9038 (a tradename for ethoxylated bisphenol A diacrylate, available from Sartomer Inc., Exton, Pa.) and CN 984 (a tradename for a urethane acrylate available from Sartomer Inc., Exton, Pa.) was prepared by dissolving these macromonomers in ethyl acetate. To this solution, 0.2% by weight (based on the total weight of acrylates) of ESCURE KTO (a tradename for a photosensitizer available from Sartomer Inc., Exton, Pa.) was added, and 5% by weight of CAB-O-SIL TS-530 (a trademark for a fumed silica pigment available from Cabot Corporation, Tuscola, Ill.) which was dispersed in the solution by sonication. This solution was coated onto the pseudo-boehmite coated cathode and dried to form the protective coating layer. The thickness of the pigmented protective coating layer was about 4 microns. The dried film was then cured by placing it on the conveyor belt of a FUSION Model P300 UV exposure unit (available from Fusion Systems Company, Torrance, Calif.) and exposing it to the UV lamps for 30 seconds to form a cured protective coating layer.

An anode for making small flat cells was made from commercial 50 µm lithium foil.

Small flat cells were made by the method of Example 7 from the separator coated cathode and lithium foil but using 0.3 g of electrolyte. Testing was performed at a discharge current of 0.42 mA/cm$^2$ to a voltage of 1.5 V and charged at a current 0.24 mA/cm$^2$ for 5 hours or to a voltage of 2.8 V.

The initial discharge capacity of the cells was 40 mAh which dropped to 20 mAh at 105 cycles.

Example 13

Small flat cells were made by the method of Example 12 except that the lithium anode foil was replaced by a $CO_2$ treated lithium foil. The treated foil was made by suspending a lithium foil of 50 µm thickness in super critical fluid (scf) $CO_2$ at 45° C. and 100 atmospheres for 1 hour to produce a scf $CO_2$ treated lithium anode material. The testing was performed by the method of Example 12.

The initial discharge capacity of the cells was 40 mAh which dropped to 20 mAh at 245 cycles. The cells made from the scf $CO_2$ treated lithium anode showed more than a 130% increase in cycle life compared with cells having the untreated lithium anodes of Example 12.

Example 14

A vacuum web coating system located in a dry room, having an unwind drive, liquid cooled drum, load cell rollers for controlling tension, a rewind drive, and two deposition zones, was loaded with an anode substrate of 23 µm PET metallized on one side with 100 nm of copper. The chamber was evacuated to 10$^{-6}$ Torr. Lithium was deposited on to the substrate by first heating a thermal evaporation Li source to 550° C. to allow significant evaporation, and then starting the web drive at 1.2 feet per minute. The lithium evaporation was allowed to stabilize to give an 8 µm coating of lithium on the copper of the substrate layer (PET/Cu/Li). The DC magnetron sputtering source zone, positioned after the lithium source, was brought up to 2.4 mTorr while bringing the lithium evaporation zone only up to 10$^{-5}$ torr. The sputtering source was given 2 kW power and copper was deposited on top of the lithium layer to a thickness of either 120, 60 or 30 nm to give a composite anode of PET/Cu/Li/Cu. The web was removed from the coating system in the dry room.

A PET/Cu/Li/Cu composite anode, with a 120 nm temporary copper protective layer and a comparative PET/Cu/Li anode were tested for reactivity to isopropyl alcohol by placing a sample in a dish and covering it with alcohol. While the lithium without the copper temporary protective coating reacted quickly, the temporary protective copper coated lithium was observed not to significantly react.

Visual observations of lithium/Cu layers showed that lithium with a 120 nm temporary copper protective layer was stable for storage overnight under vacuum at room temperature. When this sample was heated in an oven at about 90° C., the pink coloration of the copper layer disappeared as the copper and lithium layers inter-diffused, alloyed, or mixed. A similar sample placed in a freezer at about −15° C. still retained its pink color after 11 months. Samples with copper layers of 30 or 60 nm of copper were less stable, with the copper coloration disappearing after storage overnight.

Example 15

Three copper protected lithium anodes were formed by coating copper onto the lithium surface of a PET/copper/lithium anode structure as described in Example 14. The thickness of the coated copper layers on the outer surface of the lithium were 30, 60 and 120 nanometers. The copper protected lithium anodes were stored at room temperature overnight.

Small flat cells were assembled from the copper protected lithium anodes (PET/copper/lithium/copper) or uncoated PET/copper/lithium anodes as a control, with a cathode prepared by coating a mixture of 75 parts of elemental sulfur (available from Aldrich Chemical Company, Milwaukee, Wis.), 15 parts of a conductive carbon pigment PRINTEX XE-2 (a trademark for a carbon pigment available from Degussa Corporation, Akron, Ohio), and 10 parts of PYROGRAF-III (a tradename for carbon filaments available from Applied Sciences, Inc., Cedarville, Ohio) dispersed in isopropanol onto one side of a 17 micron thick conductive carbon coated aluminum foil substrate (Product No. 60303 available from Rexam Graphics, South Hadley, Mass.). After drying, the coated cathode active layer thickness was about 30 microns and the loading of sulfur in the cathode active layer was 1.07 mg/cm$^2$. The electrolyte was a 1.4 M solution of lithium bis(trifluoromethylsulfonyl)imide, (lithium imide, available from 3M Corporation, St. Paul, Minn.) in a 40:55:5 volume ratio mixture of 1,3-dioxolane, dimethoxyethane, and tetraethyleneglycol divinylether. The porous separator used was 16 micron E25 SETELA (a trademark for a polyolefin separator available from Tonen Chemical Corporation, Tokyo, Japan, and also available from Mobil Chemical Company, Films Division, Pittsford, N.Y.). The active area of the cathode and anode in the small flat cells was 25 cm$^2$.

The assembled cells were stored for 2 weeks at room temperature during which the impedance was periodically measured. The high frequency impedance (175 KHz) was found to be equal for both the control cells and the cells with copper protected lithium surfaces, irrespective of the thickness of the copper protective layer, and was representative of the conductivity of the electrolyte in the porous Tonen separator, about 10.9 ohm Cm$^2$.

Initial measurements of the low frequency impedance (80 Hz) was observed to be different for the control and copper protected lithium anodes, and was dependent on the thickness of the copper protective layer and storage time. Storage time measurements showed that the cells with a 30 nm copper protective layer had a impedance 20% higher than the control cell, while the impedance was 200% higher for cells with 60 nm copper protective layers and 500% higher for cells with 120 nm copper protective layers. The impedance for fresh control cells was around 94 ohm cm$^2$.

During storage of the cells with copper protected lithium, the impedance decreased and became equal to that of the control cells in two days for cells for 30 nm Cu, in 5 days for cells with 60 nm Cu, and in 14 days for cells with 120 nm Cu protective layers.

After storage, all cells were discharged at a current density of 0.4 mA/cm$^2$ and a voltage cutoff 1.25 V. The delivered capacities were found to be equal for the control cells and the cells with temporary copper protective layers, showing that the temporary Cu layers disappeared in about two weeks and did not prevent electrochemical cycling or reduce the cell performance.

While the invention has been described in detail and with reference to specific and general embodiments thereof, it will be apparent to one skilled in the art that various changes and modifications can be made therein without departing from the spirit and scope thereof.

The invention claimed is:

1. A method of making an anode of an electrochemical cell in a vacuum chamber wherein the method comprises:
   (a) providing a moving substrate;
   (b) moving the substrate consecutively past a lithium vapor deposition source, wherein the source is characterized by a nozzle through which lithium vapor is emitted;
   (c) providing reactive gaseous material adjacent to the lithium deposition nozzle; and
   (d) condensing the lithium vapor of (b) on the substrate in presence of gaseous material to co-deposit a lithium anode active layer to form the anode.

2. The method of claim 1, wherein the lithium vapor is condensed on the substrate by contacting the substrate with a cooled surface as the substrate passes through the vapor.

3. The method of claim 1, wherein the thickness of the co-deposited lithium layer of the anode is from 2 μm to 100 μm.

4. The method of claim 1, wherein the thickness of the co-deposited lithium layer of the anode is from 5 μm to 50 μm.

5. The method of claim 1, wherein the substrate is selected from the group consisting of metal foils, polymer films, and metallized polymer films.

6. The method of claim 5, wherein the polymer film is selected from the group consisting of films of polyethylene terephthalate, polyethylene naphthalate, 1,4-cyclohexanedimethylene terephthalate, polyethylene isophthalate, and polybutylene terephthalate.

7. The method of claim 1, wherein the gaseous material is selected from one or more of the group consisting of carbon dioxide, acetylene, nitrogen, ethylene, sulfur dioxide, hydrocarbons, alkyl phosphate esters, alkyl sulfite esters, and alkyl sulfate esters.

8. The method of claim 1, wherein the gaseous material is carbon dioxide.

* * * * *